July 7, 1931.  J. H. OLCOTT  1,813,708
SPRING SHACKLE BEARING
Filed March 12, 1930  2 Sheets-Sheet 2
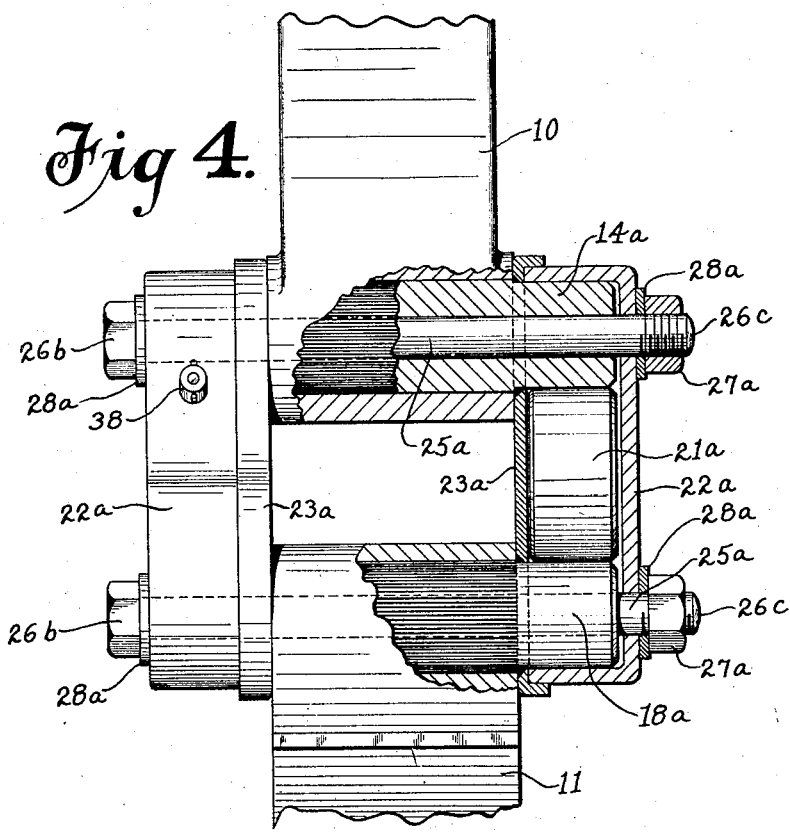
INVENTOR
James H. Olcott.
BY HIS ATTORNEY
H. G. Manning Patented July 7, 1931

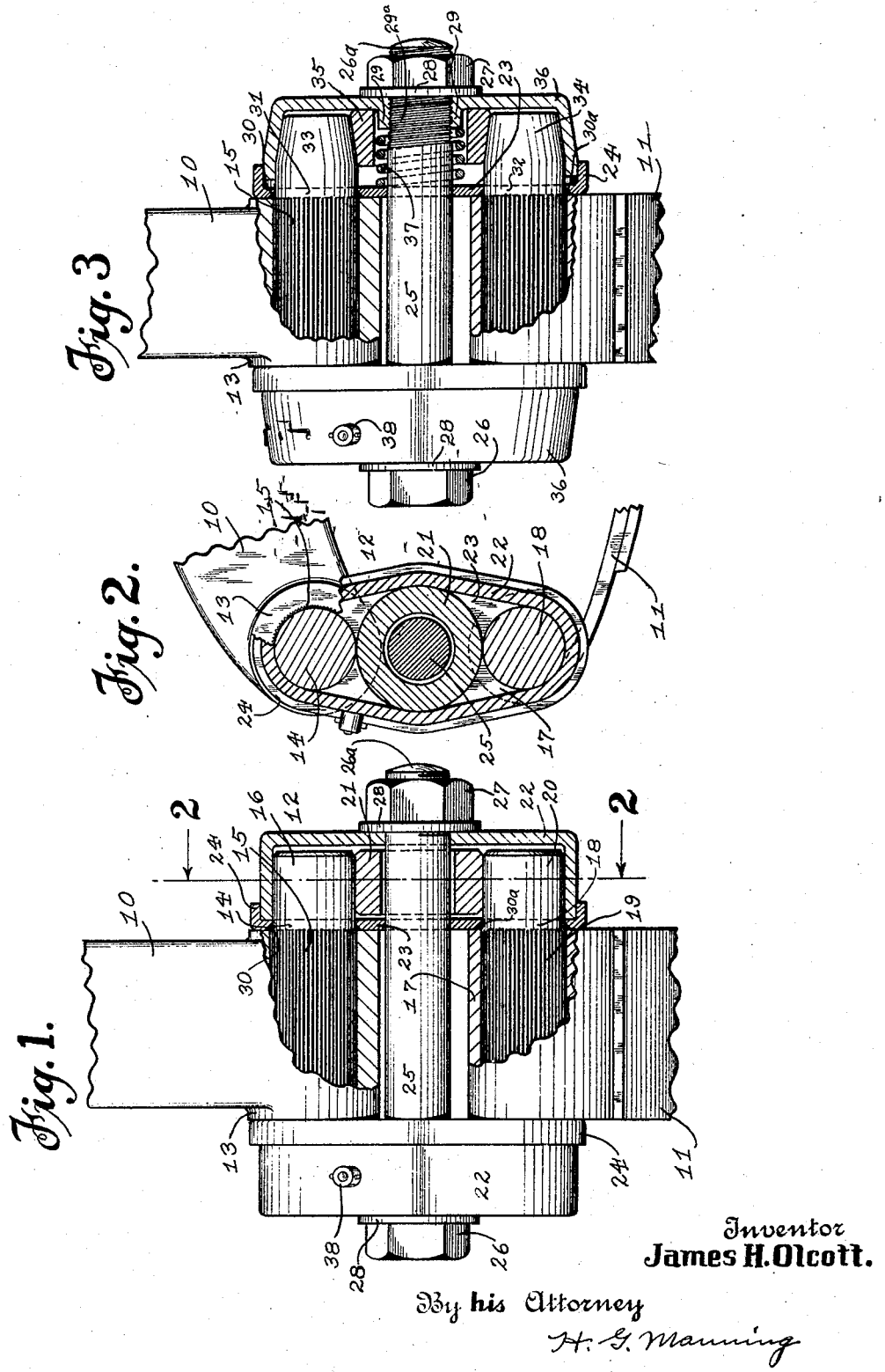

1,813,708

UNITED STATES PATENT OFFICE

JAMES H. OLCOTT, OF WATERBURY, CONNECTICUT

SPRING SHACKLE BEARING

Application filed March 12, 1930. Serial No. 435,130.

This invention relates to anti-friction bearings for vehicle springs, and more particularly to an improved shackle connection between the spring and frame of a motor vehicle.

One object of this invention is to provide an anti-friction spring shackle bearing of the above nature which will be simple in construction, inexpensive to manufacture, flexible, easy riding, noiseless, easy to install and manipulate, compact, ornamental in appearance, and very efficient and durable in use.

With these and other objects in view there have been illustrated on the accompanying drawings three forms in which the invention may be conveniently embodied in practice.

In the drawings:

Fig. 1 represents a fragmentary view, partly in section, of the improved spring shackle bearing and portions of the vehicle frame and spring to which it is attached.

Fig. 2 is a fragmentary side sectional view of the same, taken along the line 2—2 of Fig. 1, looking in the direction of the arrows.

Fig. 3 is a fragmentary end view, partially in section, of a modified form of the invention.

Fig. 4 is a view similar to Fig. 1 of another modified form of the invention.

Referring now to the drawings in which like reference numerals denote corresponding parts throughout the several views, the numeral 10 indicates the frame of a motor vehicle upon which the present invention is installed. The frame 10 is adapted to be connected to a leaf spring 11 of any standard type by means of a shackle bearing unit generally indicated by the numeral 12. The shackle bearing unit 12 is adapted to be connected to the enlarged apertured end 13 of the frame 10 by means of a solid upper bearing pin 14 having a serrated central section 15 for frictional non-rotative engagement with the inner surface of the end 13 of the frame 10, the extremities of said bearing pin 14 extending outwardly beyond said frame 10 to provide a pair of cylindrical bearing sections 16.

The spring 11 has an extremity 17 bent around a solid lower bearing pin 18 similar to the pin 14 already mentioned, said pin 18 also having a central serrated section 19 for frictional non-rotative engagement with the bent-over extremity of the spring 11 and being provided with outwardly extending lateral bearing sections 20.

In order to provide a flexible rocking connection between the bearing pins 14 and 18, provision is made of a pair of hollow roller bearings 21, one located at each side of the shackle unit, said roller bearings 21 being positioned between and in engagement with the bearing sections 16 and 20 of said bearing pins 14 and 18.

The shackle bearing pins 14 and 18 of the shackle bearing unit are joined together and adapted to be protected from dust, moisture, etc., by means of a pair of substantially oval-shaped shell members 22 for fitting about the bearing surfaces 16 and 20 of the bearing pins and embracing the roller bearings 21. The inner edges of the shell members 22 are adapted to be closed by oval-shaped inner cover plates 23 having outwardly directed flanges 24 fitting over the inner edges of said shells 22.

For the purpose of holding the shell members 22 and the cover plates 23 in the assembled operating position shown in Fig. 1, provision is made of a central bolt 25 located between the vehicle frame 10 and the spring 11 and passing through the hollow roller bearings 21. The bolt 25 has a head 26 at one end for engaging the outside surface of one of the shackle shells 22, and the other end 26a of the bolt 25 is threaded for receiving a nut 27 for engaging a washer 28, which in turn tightly engages against the outer surface of the other shackle shell 22. The central portion of the nut-engaging shell 22 is provided with an aperture fitting snugly about the bolt 25.

In order to form tight joints at the inside of the cover sections 23, provision is made of two pairs of ring gaskets 30 and 30a, two of which surrounds each of the bearing pins at the junctions between the serrated and smooth sections thereof, said gaskets being preferably triangular in cross-section, as shown in Fig. 1, and fitted snugly within similar shaped annular recesses in the inner cover plates 23.

*Operation*

In operation, when the vehicle rocks up and down due to irregularities in the road way, the bearing pins 14 and 18 will rotate slightly with respect to the two hollow roller bearings 21 therebetween, taking up the relative endwise motion between the frame 10 and spring 11.

In the form of the invention shown in Fig. 3, the shackle bearing unit is identical with that shown in Figs. 1 and 2, with the exception of the shape of the extremities of the bearing pins, the shells, and the hollow roller bearings. As shown in Fig. 3, the bearing pins 31 and 32 are provided with tapered extremities 33 and 34 which are adapted to bear on opposite sides of a reversely tapered hollow roller bearing 35. Moreover, with this modified form of the invention, an interior coil spring 37 is used to take up looseness and wear between the bearing surfaces. The central portion of the nut-engaging shell 36 is provided with an inwardly extending integral neck 29 which is internally threaded for engagement with the threads 29a on the bolt 25, thus forming a more rigid construction.

In all forms of the invention the shackle shells (22 and 36) are preferably provided with grease fittings 38 in order to permit a supply of grease or other lubricant to be forced into the interior of said shells, as by a grease gun.

While as herein disclosed in Figs. 1–3 the shackle shells are connected by a bolt passing through the interior of the roller bearings, it will be understood that if desired the shells may be connected by bolts passing through longitudinal holes in the center of the bearing pins. This construction is shown in Fig. 4.

In this form of the invention, instead of having shell members and cover plates held in assembled position by a single central bolt, these parts are held together by means of two smaller bolts 25a passing through the upper and lower bearing pins 14a and 18a and the shells 22a and cover plates 23a. The bolts 25a have heads 26b, threaded end sections 26c, nuts 27a, and washers 28a, as shown. In this construction, the roller bearings 21a are preferably made solid instead of hollow as in the previous forms of the invention.

While there have been disclosed in this specification three forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention what is claimed as new, and for which it is desired to secure Letters Patent, is:

1. In a shackle, a pair of oppositely disposed cup-shaped oval shells, a connecting bolt passing through the centers of said shells, a pair of roller bearings surrounding the ends of said bolt and located within said shells, and a pair of bearing pins engaging both of said roller bearings at opposite sides of said bolt, one of said bearing pins being rigidly connected to the frame of a vehicle and the other bearing pin being rigidly connected to the extremity of a spring of said vehicle.

2. In a shackle for connecting the ends of a vehicle frame and spring, a pair of bearing pins extending through said ends, a pair of roller bearings located between said bearing pins, and a pair of shells for surrounding said bearing pins and roller bearings.

3. In a shackle for connecting the ends of a vehicle frame and spring, a pair of bearing pins extending through said ends, a pair of roller bearings located between said bearing pins, a pair of shells for surrounding said bearing pins and roller bearings, and means for connecting said shells.

4. In a shackle for connecting the ends of a vehicle frame and a vehicle spring, a pair of bearing pins extending through said ends and rigidly connected thereto, a pair of roller bearings located between said bearing pins, and means for holding said pins and bearings in assembled relation.

5. In a shackle for connecting the ends of a vehicle frame and a vehicle spring, a pair of bearing pins extending through said ends, a pair of roller bearings located between said bearing pins, and means for holding said pins and bearings in assembled relation, said pins having serrated central sections for frictionally engaging with the interior of said ends.

6. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and spring means surrounding said bolt for taking up looseness between said shell members and said vehicle frame and spring.

7. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and a pair of cover plates for closing the inner sides of said shell members to exclude dust and retain lubricant therein.

8. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and a pair of cover plates for closing the inner sides of said shell members to exclude dust and retain lubricant therein, said cover plates having outwardly extending flanges for fitting over the inner edges of said shell members.

9. In a shackle for connecting the ends of a vehicle frame and a vehicle spring, tapered bearing members extending laterally from the sides of said ends, a pair of reversely tapered roller bearings located between said bearing members, shell members to hold said bearing members and roller bearings in assembled position, and a bolt located between said ends for connecting said shell members.

10. In a shackle for connecting the ends of a vehicle frame and a vehicle spring, tapered bearing members extending laterally from the sides of said ends, a pair of reversely tapered roller bearings located between said bearing members, oval-shaped tapered shell members to hold said bearing members and roller bearings in assembled position, and a bolt located between said ends for connecting said shell members.

11. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and spring means surrounding said bolt and located within said roller bearing for taking up looseness between said shells and said vehicle frame and spring.

12. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and means on the exterior of said shells for permitting the introduction of lubricant therein.

13. In a shackle for connecting the ends of a vehicle frame and a vehicle spring, a pair of bearing pins extending through said ends and rigidly connected thereto, a pair of roller bearings located between said bearing pins, and means extending through said roller bearings for holding said pins and bearings in assembled relation.

14. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends and passing through said roller bearings for connecting said shell members, and spring means surrounding said bolt for taking up looseness between said shells and said vehicle frame and spring.

15. In a shackle for connecting the ends of a vehicle frame and a vehicle spring, bearing members extending laterally from the sides of said ends, a pair of roller bearings located between said bearing members, shell members to hold said bearing members and roller bearings in assembled position, a bolt located between said ends for connecting said shell members, and a coiled spring surrounding said bolt for taking up looseness between said shells and said vehicle frame and spring.

16. In a shackle for connecting the ends of a vehicle frame and a vehicle spring, a pair of bearing pins extending through said ends and rigidly connected thereto, a roller bearing located between said bearing pins, and means for holding said pins and bearings in assembled relation.

In testimony whereof, I have affixed my signature to this specification.

JAMES H. OLCOTT.